(12) United States Patent
Liu et al.

(10) Patent No.: US 10,986,684 B2
(45) Date of Patent: Apr. 20, 2021

(54) NETWORK DISTRIBUTION AND PAIRING METHOD, CONTROL TERMINAL, DEVICE AND SERVER

(71) Applicant: Baidu Online Network Technology (Beijing) Co., Ltd., Beijing (CN)

(72) Inventors: Shuaizheng Liu, Beijing (CN); Song Yang, Beijing (CN); Mujin Wang, Beijing (CN); Xujie Zhu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/710,868

(22) Filed: Dec. 11, 2019

(65) Prior Publication Data

US 2020/0359442 A1 Nov. 12, 2020

(30) Foreign Application Priority Data

May 7, 2019 (CN) .......................... 201910376920.6

(51) Int. Cl.
*H04W 76/18* (2018.01)
*H04W 76/14* (2018.01)

(52) U.S. Cl.
CPC .......... *H04W 76/18* (2018.02); *H04W 76/14* (2018.02)

(58) Field of Classification Search
CPC ....... H04W 76/18; H04W 76/14; H04W 4/80; H04W 76/10; H04W 76/19
USPC .......................................................... 455/41.2
See application file for complete search history.

(56) References Cited

U.S. PATENT DOCUMENTS

2013/0086644 A1\* 4/2013 Bahn .................. H04L 12/2825 726/4
2019/0036761 A1\* 1/2019 Cao ..................... H04W 88/023

FOREIGN PATENT DOCUMENTS

CN 107465584 A 12/2017
CN 108924875 A 11/2018

\* cited by examiner

*Primary Examiner* — Eugene Yun
(74) *Attorney, Agent, or Firm* — Lathrop GPM LLP

(57) ABSTRACT

The present disclosure provides a network matching and pairing method, including: connecting to a device via bluetooth; transmitting an instruction of setting a high bluetooth connection parameter to the device via bluetooth, for the device to set a bluetooth connection parameter thereof as a high bluetooth connection parameter; transmitting WiFi information to the device via bluetooth, the WiFi information comprising information of a WiFi connection end; and transmitting an instruction of setting a low bluetooth connection parameter to the device via bluetooth, for the device to set the bluetooth connection parameter thereof as a low bluetooth connection parameter and to connect to the WiFi connection terminal via WiFi under the low bluetooth connection parameter.

14 Claims, 2 Drawing Sheets

NETWORK DISTRIBUTION AND PAIRING METHOD, CONTROL TERMINAL, DEVICE AND SERVER

CROSS-REFERENCE TO RELATED APPLICATIONS

This application claims priority to Chinese Patent Application No. 201910376920.6, filed with the China National Intellectual Property Administration (CNIPA) on May 7, 2019, the content of which is incorporated herein by reference in its entirety.

TECHNICAL FIELD

The present disclosure relates to the field of wireless communication technologies, in particular to a network matching and pairing method, a control terminal, a device, a server and a computer readable medium.

BACKGROUND

For a smart hardware device controlled by a mobile APP, the network matching process thereof refers to a process of connecting the smart hardware device to a designated WiFi (including a network hotspot), and the pairing process thereof refers to a process of performing a bluetooth pairing between the smart hardware device and the mobile APP. Successful network matching and paring are prerequisites for the smart hardware device to be used normally. The duration of the network matching and pairing refers to the duration starting from a user inputting a WiFi password on the mobile APP to a smart hardware device (such as a smart speaker) broadcasting that a network is connected successfully.

The network matching and pairing process of a smart network device relies on hardware. In the prior art, a WiFi-bluetooth combo module with a low cost is used for the network matching and pairing. In such a network matching and pairing scenario, bluetooth and WiFi share a baseline. When the bluetooth and the WiFi are turned on at the same time, bluetooth data throughput will be reduced and the WiFi will interrupt intermittently. The smart hardware device has a low WiFi router connection success rate, a low mobile hotspot connection success rate and a slow connection speed, and the network matching and pairing processes take a long time. Moreover, the existing network matching and pairing processes are mostly implemented by network matching followed by pairing, which will result in separate time consuming by the network matching process and the pairing process and dispersion of transmission data.

Moreover, the WiFi-bluetooth combo module cannot modify a connection parameter of a WiFi router or a mobile hotspot via bluetooth communication, which further leads to an increase in a hardware cost and an increase in technical implementation difficulty for modifying the connection parameter of the WiFi router or the mobile hotspot.

Moreover, the existing network matching and pairing processes do not consider the compatibilities of the WiFi router and the mobile hotspot. All types of WiFi routers and mobile hotspots use an identical parameter setting scheme for network matching, which may result in a low WiFi connection success rate of some WiFi routers or mobile hotspots.

It should be noted that, the above description on the technical background is only intended to facilitate a clear and complete description of the technical solution of the present disclosure and the understanding of those skilled in the art. It cannot be assumed that the above technical solutions are known to those skilled in the art just because they are described in the background technical part of the present disclosure.

SUMMARY

Embodiments of the present disclosure provides a network matching and pairing method, a control terminal, a device, a server and a computer readable medium.

In the first aspect, some embodiments of the present disclosure provide a network matching and pairing method, including: connecting to a device via bluetooth; transmitting an instruction of setting a high bluetooth connection parameter to the device via bluetooth, for the device to set a bluetooth connection parameter thereof as a high bluetooth connection parameter; transmitting WiFi information to the device via bluetooth, the WiFi information comprising information of a WiFi connection end; and transmitting an instruction of setting a low bluetooth connection parameter to the device via bluetooth, for the device to set the bluetooth connection parameter thereof as a low bluetooth connection parameter, and to connect to the WiFi connection end via WiFi under the low bluetooth connection parameter.

In some embodiments, before the transmitting WiFi information to the device via bluetooth, the method further includes: receiving the WiFi information, and determining a WiFi type of the WiFi connection end based on the WIFI information; and in response to the determined WiFi type being a hotspot, transmitting an instruction of adjusting a timeout retry time of a DHCP detection to the device according to the type of the WiFi connection end, for the device to adjust a timeout retry time of a DHCP detection corresponding to the WiFi connection end.

In some embodiments, the adjusting a timeout retry time of a DHCP detection includes: in response to the type of the WiFi connection terminal being an IOS type, reducing the timeout retry time of the DHCP detection; and in response to the type of the WiFi connection being an Android type, increasing the timeout retry time of the DHCP detection.

In some embodiments, after the transmitting WiFi information to the device via bluetooth, the method further includes: receiving device information sent from the device via bluetooth, and transmitting, based on the device information, a registration request corresponding to the device to a registration end.

In some embodiments, the device includes a smart speaker controlled by a smart terminal.

In a second aspect, some embodiments of the present disclosure provide a network matching and pairing method, including: connecting to a control terminal via Bluetooth; receiving an instruction of setting a high bluetooth connection parameter from the control terminal via bluetooth, and setting a bluetooth connection parameter as a high bluetooth connection parameter; receiving WiFi information from the control terminal via bluetooth, the WiFi information comprising information of a WiFi connection end; executing a WiFi pre-scanning process based on the WIFI information; receiving an instruction of setting a low bluetooth connection parameter from the control terminal via bluetooth, and setting the bluetooth connection parameter as a low bluetooth connection parameter; and connecting to the WiFi connection terminal via WiFi.

In some embodiments, the setting a bluetooth connection parameter as a high Bluetooth connection parameter includes: setting a task priority of a bluetooth connection driver to be greater than a task priority of a WiFi connection driver; and the setting the bluetooth connection parameter as a low bluetooth connection parameter includes: the setting the bluetooth connection parameter as a low bluetooth connection parameter comprises.

In a third aspect, some embodiments of the present disclosure provide a control terminal, including: a bluetooth module, configured to: connect to a device via bluetooth; transmit an instruction of setting a high bluetooth connection parameter to the device via bluetooth, for the device to set a Bluetooth connection parameter thereof as a high Bluetooth connection parameter; transmit WiFi information to the device via bluetooth, the WiFi information comprising information of a WiFi connection end; and transmit an instruction of setting a low bluetooth connection parameter to the device via bluetooth, for the device to set the bluetooth connection parameter thereof as a low bluetooth connection parameter and to connect to the WiFi connection terminal via WiFi under the low bluetooth connection parameter.

In some embodiments, the device terminal further includes: a receiving module, configured to receive the WiFi information; a determination module, configured to determine, based on the WiFi information, a WiFi type of the WiFi connection end; and an adjustment module, configured to transmit an instruction of adjusting a timeout retry time of a DHCP detection to the device according to the type of the WiFi connection end in response to the determined WiFi type being a hotspot, for the device to adjust a timeout retry time of a DHCP detection corresponding to the WiFi connection end.

In some embodiments, the adjustment module is configured to: reduce the timeout retry time of the DHCP detection in response to the type of the WiFi connection terminal being an IOS type; and increase the timeout retry time of the DHCP detection in response to the type of the WiFi connection being an Android type.

In some embodiments, the device terminal further includes a transmitting module, where the first bluetooth module is also configured to receive device information sent from the device via bluetooth; and the transmitting module is configured to transmit, based on the device information, a registration request corresponding to the device to a registration end.

In some embodiments, the device includes a smart speaker controlled by a smart terminal.

In a fourth aspect, some embodiments of the present disclosure provide a device, including: a second bluetooth module, configured to: connect to a control terminal via bluetooth; receive an instruction of setting a high bluetooth connection parameter from the control terminal via bluetooth; receive WiFi information from the control terminal via bluetooth, the WiFi information comprising information of a WiFi connection end; and receive an instruction of setting a low bluetooth connection parameter from the control terminal via Bluetooth; a setting module, configured to set a bluetooth connection parameter as a high bluetooth connection parameter, and set the bluetooth connection parameter as a low bluetooth connection parameter; an execution module, configured to execute a WiFi pre-scanning process based on the WIFI information; and a WiFi module, configured to connect to the WiFi connection terminal via WiFi.

In some embodiments, the setting module is further configured to: set a task priority of a bluetooth connection driver to be greater than a task priority of a WiFi connection driver; and set the task priority of the WiFi connection driver to be greater than the task priority of the bluetooth connection driver.

In a fifth aspect, some embodiments of the present disclosure provide a server, including one or more processors; and a storage apparatus, storing one or more programs, where the one or more programs, when executed by the one or more processors, cause the one or more processors to implement the network distribution and pairing method according to any one of claims 1-5 or the above network matching and pairing methods.

In a sixth aspect, some embodiments of the present disclosure provide a computer readable medium, storing a computer program thereon, when the program is executed, the above network matching and pairing method according to any one of claims 1-5 or the network matching and pairing method according to claim 6 or 7 is implemented.

A network matching and pairing method provided by some embodiments of the present disclosure includes: connecting to a device via bluetooth; transmitting an instruction of setting a high bluetooth connection parameter to the device via bluetooth, for the device to set a bluetooth connection parameter thereof as a high bluetooth connection parameter; transmitting WiFi information to the device via bluetooth, the WiFi information comprising information of a WiFi connection end; and transmitting an instruction of setting a low bluetooth connection parameter to the device via bluetooth, for the device to set the bluetooth connection parameter thereof as a low bluetooth connection parameter and to connect to the WiFi connection terminal via WiFi under the low bluetooth connection parameter. thereby the impact of the bluetooth communication and the WiFi communication is effectively avoided and the network matching and paring efficiency is increased. Moreover, a data transmission process of the network matching and pairing processes is flexibly set, and a plurality of data transmission steps may be performed in parallel, which shortens the time consumption of the network matching and pairing processes and avoids dispersion of transmission data.

BRIEF DESCRIPTION OF THE DRAWINGS

The accompanying drawings are used for further understanding the embodiments of the present disclosure, and form a part thereof. Such accompanying drawings are used to explain the present disclosure together with embodiments of the present disclosure, but not to limit thereto. With the descriptions of example embodiments with reference to the accompanying drawings, the features above and other features and advantages will become more apparent to those skilled in the art. Among the accompanying drawings.

DETAILED DESCRIPTION OF EMBODIMENTS

In order to enable those skilled in the art to better understand the technical solution of the present disclosure, the network matching and pairing method, control terminal and device provided by the present disclosure are described in detail below with reference to the accompanying drawings.

The example embodiments are described more fully hereinafter with reference to the accompanying drawings, but such example embodiments may be embodied in different forms and should not be construed as limited to the embodiments set forth herein. Rather, these embodiments are provided to make the description on the present disclosure thorough and complete and to allow those skilled in the art to understand the scope of the present disclosure.

The term used herein is for the purpose of describing particular embodiments only and is not intended to limit the scope of present disclosure. As used herein, the singular forms "a", "an" and "the" are intended to include the plural forms as well, unless the context clearly indicates otherwise. It will be further understood that the terms "comprises" and/or "made of . . . ," when used in this description, specify the presence of stated features, integers, steps, operations, elements, and/or components, but do not preclude the presence or addition of one or more other features, integers, steps, operations, element components, and/or groups thereof.

Unless otherwise defined, all terms (including technical and scientific terms) used herein have the same meaning as commonly understood by those of ordinary skill in the art. It will be further understood that terms, such as those defined in commonly used dictionaries, should be interpreted as having a meaning that is consistent with their meaning in the context of the relevant art and the context of the present disclosure, and will not be interpreted in an idealized or overly formal sense unless expressly so defined herein.

Figure 1:
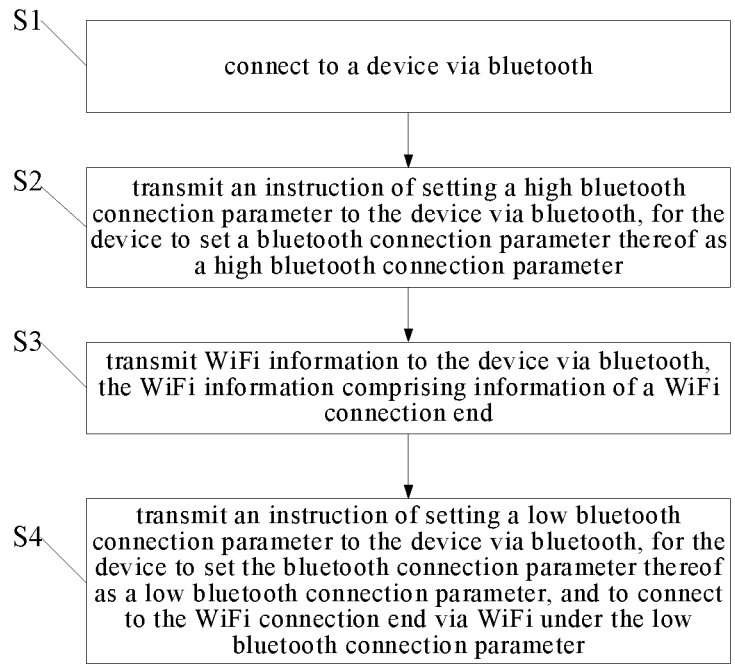
FIG. 1 is a schematic flowchart of a network matching and pairing method according to an embodiment of the present disclosure.

FIG. 1 is a schematic flowchart of a network matching and pairing method according to an embodiment of the present disclosure. As shown in FIG. 1, the method may be executed by a control terminal, and the control terminal may be implemented using software and/or hardware and is used for controlling a corresponding device. The method comprises:

Step S1: connecting to a device via bluetooth.

The device may be a smart home device. Preferably, the device is a smart speaker. For example, a mobile terminal or a mobile APP connects to the smart speaker via bluetooth.

Step S2: transmitting an instruction of setting a high bluetooth connection parameter to the device via bluetooth, for the device to set a bluetooth connection parameter thereof as a high bluetooth connection parameter.

The device sets a current bluetooth connection parameter as a high bluetooth connection parameter according to the instruction of setting a high bluetooth connection parameter.

The high bluetooth connection parameter may be derived from historical experience or derived experimentally. Under the high bluetooth connection parameter, the bluetooth transmission performance of the device is improved, and the bluetooth data transmission is accelerated.

Figure 2:
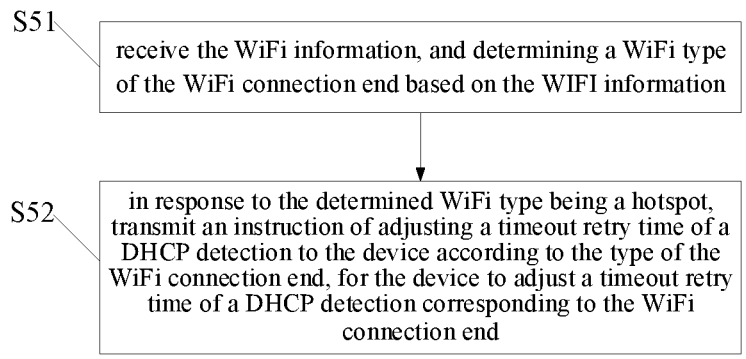
FIG. 2 is a schematic flowchart of a WiFi type determining step according to an embodiment of the present disclosure.

FIG. 2 is a schematic flowchart of a WiFi type determining step according to an embodiment of the present disclosure. As shown in FIG. 2, before the step S3 is executed, a WiFi type determining step is further included. The WiFi type determining step comprises:

Step S51: receiving WiFi information, and determining a WiFi type of the WiFi connection end based on the WIFI information.

WiFi information sent by a user by means of a triggering operation is received.

The WiFi type of the WiFi connection end includes a WiFi router and a hotspot, and the hotspot may be a mobile hotspot. Specifically, the WiFi information may include an IP address of the WiFi connection end, and the WiFi type of the WiFi connection end is determined based on the IP address of the WiFi.

Step S52: in response to the determined WiFi type being a hotspot, transmitting an instruction of adjusting a timeout retry time of a DHCP detection to the device according to the type of the WiFi connection end, for the device to adjust a timeout retry time of a DHCP detection timeout corresponding to the WiFi connection end.

Specifically, acquiring an MAC address database of the WiFi connection end, and determining the type of the WiFi connection end based on the MAC address database. When the type of the WiFi connection is an IOS type, the timeout retry time of the DHCP detection is reduced. Since the compatibility of an IOS type terminal is good, such a setting may improve the WiFi connection efficiency between the device and the WiFi connection end. When the type of the WiFi connection is an Android type, the timeout retry time of the DHCP detection is increased. Due to the poor compatibility of an Android type terminal, such a setting may improve the success rate of the WiFi connection between the device and the WiFi connection end.

According to the network matching and pairing method of the present embodiment, the device may modify a connection parameter (for example, a timeout retry time of the DHCP detection) of the WiFi connection end (such as a hotspot terminal) via bluetooth, and then set different timeout retry times of the DHCP detection for different WiFi connection ends, thereby effectively improving the WiFi connection efficiency and connection success rate between the device and the WiFi connection end.

Step S3: transmitting WiFi information to the device via bluetooth, the WiFi information comprising information of a WiFi connection end.

WiFi information is transmitted to the device by means of a bluetooth communication under a high bluetooth connection parameter.

Figure 3:
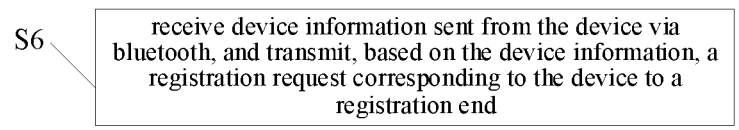
FIG. 3 is a schematic flowchart of a registration step according to an embodiment of the present disclosure.

FIG. 3 is a schematic flowchart of a registration step according to an embodiment of the present disclosure. As shown in FIG. 3, after step S3 is executed, a registration step is further included, the registration step comprising:

Step S6: receiving device information sent from the device via bluetooth, and transmitting, based on the device information, a registration request corresponding to the device to a registration end.

Optionally, when a registration request corresponding to the device is transmitted to a registration end based on the device information, user information is also transmitted to the device.

The registration end stores a binding relationship between the user and the device, and the registration end is configured to execute a registration process corresponding to the device according to the registration request. Subsequently, the registration end feeds back registration success information to the control terminal, and the control terminal transmits a registration result to the device.

The registration process consumes more time. According to the network matching and pairing method according to some embodiments of the present disclosure, a registration request is transmitted to the registration end after device information sent from the device is received, and while the registration end implements the registration process and feeds back the registration success information, the process of connecting the device to the WiFi connection end via WiFi is implemented in parallel, which shortens the time consumption.

Step S4: transmitting an instruction of setting a low bluetooth connection parameter to the device via bluetooth, for the device to set the bluetooth connection parameter thereof as a low bluetooth connection parameter and to connect to the WiFi connection terminal via WiFi under the low bluetooth connection parameter.

The low bluetooth connection parameter may be derived from historical experience or derived experimentally. Under the low bluetooth connection parameter, the bluetooth transmission performance of the device is reduced and the bluetooth data transmission is slowed down, and accordingly, the WiFi transmission performance of the device is improved.

The network matching and pairing method provided by some embodiments of the present disclosure comprises: connecting to a device by means of bluetooth; transmitting an instruction of setting a high bluetooth connection parameter to the device via bluetooth, for the device to set a bluetooth connection parameter thereof as a high bluetooth connection parameter; transmitting WiFi information to the device via bluetooth, the WiFi information comprising information of a WiFi connection end; and transmitting an instruction of setting a low bluetooth connection parameter to the device via bluetooth, for the device to set the Bluetooth connection parameter thereof as a low bluetooth connection parameter and to connect to the WiFi connection terminal via WiFi under the low bluetooth connection parameter. Thereby the impact of the bluetooth communication and the WiFi communication is effectively avoided and the network matching and paring efficiency is increased. Moreover, a data transmission process of the network matching and pairing processes is flexibly set, and a plurality of data transmission steps may be performed in parallel, which shortens the time consumption of the network matching and pairing processes and avoids dispersion of transmission data.

Figure 4:
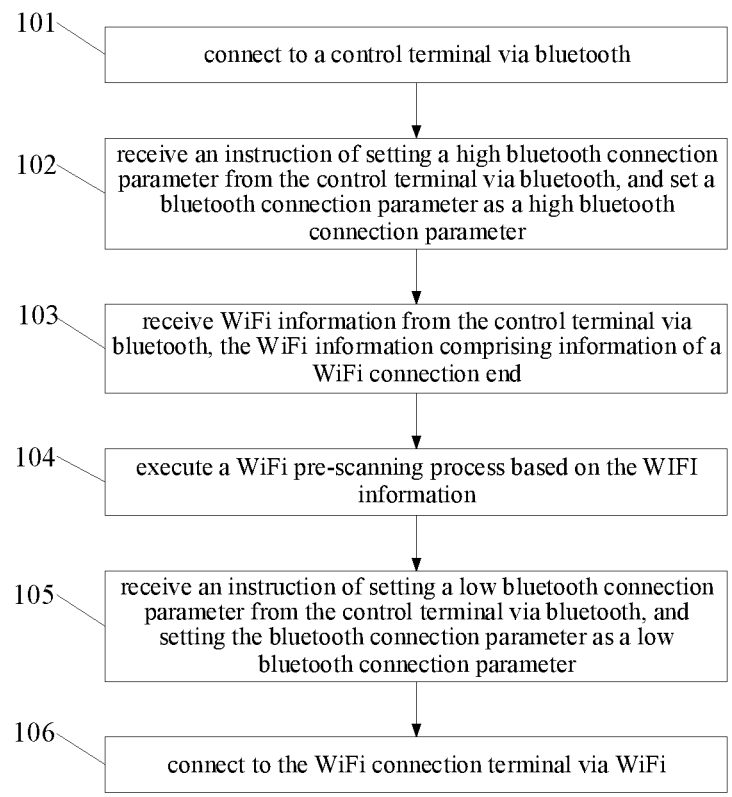
FIG. 4 is a schematic flowchart of a r network matching and pairing method according to another embodiment of the present disclosure.

FIG. 4 is a schematic flowchart of a network matching and pairing method according to another embodiment of the present disclosure. As shown in FIG. 4, the method may be executed by a device, and the device may be implemented by means of hardware. The device is an smart terminal. The method comprises:

Step 101: connecting to a control terminal via bluetooth.

The control terminal may be a control terminal provided in the present embodiment, and the device is a smart speaker. For example, the smart speaker connects to a mobile terminal or a mobile APP via bluetooth.

Step 102: receiving an instruction of setting a high bluetooth connection parameter from the control terminal via bluetooth, and setting a bluetooth connection parameter as a high Bluetooth connection parameter.

For details, refer to the description of step S2, and such step will not be repeated here.

Step 102 comprises: setting a task priority of a bluetooth connection driver to be greater than a task priority of a WiFi connection driver.

Step 103: receiving WiFi information from the control terminal via bluetooth, the WiFi information comprising information of a WiFi connection end.

Step 104: executing a WiFi pre-scanning process according to the WIFI information.

According to the network matching and pairing method of the present embodiment, the device, after receiving the WiFi information, performs a WiFi pre-scanning process, which may effectively shorten the subsequent WiFi connection time.

Step 105: receiving an instruction of setting a low bluetooth connection parameter from the control terminal via bluetooth, and setting a bluetooth connection parameter as a low bluetooth connection parameter.

For details, refer to the description of step S4, and such step will not be repeated here.

Step 105 also comprises: setting the task priority of the WiFi connection driver to be greater than the task priority of the bluetooth connection driver.

According to the network matching and pairing method of the present embodiment, the task priority of the bluetooth connection driver is set to be greater than the task priority of the WiFi connection driver during the communication via the bluetooth, and the task priority of the WiFi connection driver is set to be greater than the task priority of the bluetooth connection driver during the communication via the WiFi, which may reduce the mutual influence between the bluetooth communication and the WiFi communication, and improve the network matching and pairing stability.

Step 106: connecting to the WiFi connection terminal via WiFi.

After the device is connected to the WiFi connection end via WiFi, the device succeeds in network matching and pairing. Optionally, the device is a smart speaker, and the smart speaker broadcasts a networking success voice after network matching and pairing is successful.

On the basis of the network matching and pairing method provided by the present embodiment, the time of the network matching and pairing process of the smart speaker may be shortened to 3s and the network matching and pairing success rate may be improved to 96% or more in a test scenario of the smart speaker, while under the existing network matching and pairing method the time for the network matching and pairing process of a same type smart speaker is 10 s-20 s and the network matching and pairing success rate thereof is 80%.

The network matching and pairing method provided by some embodiments of the present embodiment comprises: connecting to a control terminal via bluetooth; receiving an instruction of setting a high bluetooth connection parameter from the control terminal via bluetooth, and setting a bluetooth connection parameter as a high bluetooth connection parameter; receiving WiFi information from the control terminal via bluetooth, the WiFi information comprising information of a WiFi connection end; executing a WiFi pre-scanning process according to the WIFI information; receiving an instruction of setting a low bluetooth connection parameter from the control terminal via bluetooth, and setting the bluetooth connection parameter as a low bluetooth connection parameter; and connecting to the WiFi connection terminal via WiFi. Thereby the impact of the bluetooth communication and the WiFi communication is effectively avoided and the network distribution and paring efficiency is increased.

It should be noted that although the operations of the method according to some embodiments of the present disclosure are described in a particular order in the figures, it is not required or implied that the operations must be performed in such particular order or that all of the operations shown must be performed to achieve a desired result. Additionally or alternatively, certain steps may be omitted, a plurality of steps may be combined into one step, and/or a step may be broken down into a plurality of steps.

It should be noted that the technical means involved in the embodiments of the present disclosure may be combined with each other without contradicting each other.

Figure 5:
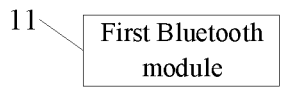
FIG. 5 is a schematic structural diagram of a control terminal according to an embodiment of the present disclosure.

FIG. 5 is a schematic structural diagram of a control terminal according to an embodiment of the present disclosure. The control terminal may be used to implement the network matching and pairing method provided in the present embodiment. As shown in FIG. 5, the control terminal comprises a first bluetooth module 11.

The bluetooth module 11 is configured to: connect to a device via bluetooth; transmitting an instruction of setting a high bluetooth connection parameter to the device via bluetooth, for the device to set a bluetooth connection parameter thereof as a high bluetooth connection parameter; transmitting WiFi information to the device via bluetooth, the WiFi information comprising information of a WiFi connection end; and transmitting an instruction of setting a low bluetooth connection parameter to the device via bluetooth, for the device to set the bluetooth connection parameter thereof as a low bluetooth connection parameter and to connect to the WiFi connection terminal via WiFi under the low bluetooth connection parameter.

Figure 6:
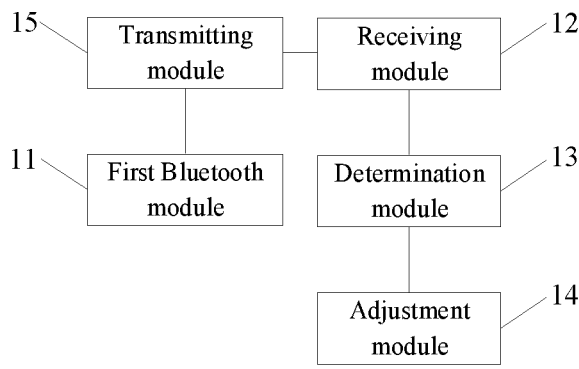
FIG. 6 is a schematic structural diagram of a control terminal according to another embodiment of the present disclosure.

FIG. 6 is a schematic structural diagram of another control terminal provided by an embodiment of the present disclosure. As shown in FIG. 6, the control terminal further comprises a receiving module 12, a determination module 13 and an adjustment module 14.

The receiving module 12 is configured to receive the WiFi information; the determination module 13 is configured to determine, based on the WiFi information, a WiFi type of the WiFi connection end; and the adjustment module 14 is configured to transmit an instruction of adjusting a timeout retry time of a DHCP detection to the device according to the type of the WiFi connection end in response to the determined WiFi type being a hotspot, for the device to adjust a timeout retry time of a DHCP detection corresponding to the WiFi connection end.

Further, the adjustment module 14 is configured to reduce the timeout retry time of the DHCP detection in response to the type of the WiFi connection terminal being an IOS type; and increase timeout retry time of the DHCP detection in response to the type of the WiFi connection being an Android type.

Further, the control terminal further comprises a transmitting module 15. The first bluetooth module 11 is also configured to receive device information sent from the device via bluetooth. The transmitting module 15 is configured to transmit, based on the device information, a registration request corresponding to the device to a registration end Further, the device is a smart speaker controlled by a smart terminal.

Figure 7:
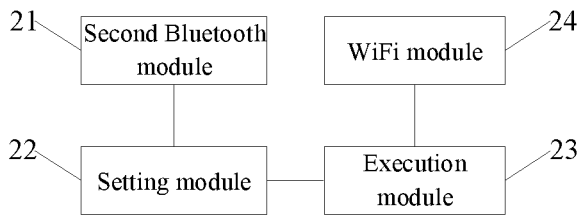
FIG. 7 is a schematic structural diagram of a device according to an embodiment of the present disclosure.

FIG. 7 is a schematic structural diagram of a device according to an embodiment of the present disclosure. The device may be used to implement the network matching and pairing method provided by the present embodiment. The device is a smart speaker. As shown in FIG. 7, the device comprises a second bluetooth module 21, a setting module 22, an execution module 23 and a WiFi module 24.

The second bluetooth module 21 is configured to connect to a control terminal via bluetooth, receive an instruction of setting a high bluetooth connection parameter from the control terminal via Bluetooth, receive WiFi information from the control terminal via bluetooth, the WiFi information comprising information of a WiFi connection end, and receive an instruction of setting a low bluetooth connection parameter from the control terminal via bluetooth; the setting module 22 is configured to set a bluetooth connection parameter as a high bluetooth connection parameter, and set the bluetooth connection parameter as a low bluetooth connection parameter; the execution module 23 is configured to execute a WiFi pre-scanning process according to the WIFI information; and the WiFi module 24 is configured to connect to the WiFi connection terminal via WiFi.

Further, the setting module 22 is further configured to set a task priority of a bluetooth connection driver to be greater than a task priority of a WiFi connection; and setting the task priority of the WiFi connection driver to be greater than the task priority of the bluetooth connection driver.

An embodiment of the present disclosure also provides a server, comprising: one or more processors; and a storage apparatus, storing one or more programs, wherein the one or more programs, when executed by the one or more processors, cause the one or more processors to implement the network matching and pairing method provided by the embodiments above.

An embodiment of the present disclosure also provides a computer readable medium storing a computer program, wherein the program is executed to implement the network matching and pairing method provided in the embodiments above.

In addition, the description of the implementation details and technical effects of the modules, sub-modules, units and sub-units may refer to the description of the foregoing method embodiments, and details are not described herein again.

Those of ordinary skill in the art will appreciate that all or some of the steps in the disclosed method and functional modules/units in the apparatus may be implemented as software, firmware, hardware and suitable combinations thereof. In a hardware implementation, the division of functional modules/units mentioned in the description does not necessarily correspond to the division of physical components. For example, a physical component may have multiple functions, or one function or step may be executed by several physical components together. Some or all physical components may be implemented as software executed by a processor, such as a central processing unit, a digital signal processor or a microprocessor, or implemented as hardware, or implemented as an integrated circuit such as a specific integrated circuit. Such software may be distributed in a computer readable medium which may include a computer storage medium (or a non-transitory medium) and a communication medium (or a transitory medium). As is well known to those of ordinary skill in the art, the term "computer storage medium" includes volatile and non-volatile, removable and non-removable media implemented in any method or technology for storage of information such as computer-readable instructions, data structures, program modules or other data. The computer storage medium includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer. Moreover, it is well known to those of ordinary skill in the art that the communication The example embodiments have been disclosed herein. Although specific terms are employed, such terms are intended to be used only as a generic description and are not intended to be limiting. In some examples, it is apparent to those skilled in the art that the features, characteristics and/or elements described in connection with the specific embodiments may be used alone, or the features, characteristics and/or elements described in connection with other embodiments may be used in a combining method, unless otherwise specifically indicated. Accordingly, it will be understood by those skilled in the art that various modifications in form and detail may be made without departing from the scope of the present disclosure.

What is claimed is:

1. A network matching and pairing method, comprising:
    connecting to a device via bluetooth;
    transmitting an instruction of setting a high bluetooth connection parameter to the device via bluetooth, for the device to set a bluetooth connection parameter thereof as a high bluetooth connection parameter;
    transmitting WiFi information to the device via bluetooth, the WiFi information comprising information of a WiFi connection end; and
    transmitting an instruction of setting a low bluetooth connection parameter to the device via bluetooth, for the device to set the bluetooth connection parameter thereof as a low bluetooth connection parameter, and to connect to the WiFi connection end via WiFi under the low bluetooth connection parameter,
    wherein before the transmitting WiFi information to the device via bluetooth, the method further comprises:
    receiving the WiFi information, and determining a WiFi type of the WiFi connection end based on the WIFI information; and
    in response to the determined WiFi type being a hotspot, transmitting an instruction of adjusting a timeout retry time of a DHCP detection to the device according to the type of the WiFi connection end, for the device to adjust a timeout retry time of a DHCP detection corresponding to the WiFi connection end.

2. The network matching and pairing method according to claim 1, wherein the adjusting a timeout retry time of a DHCP detection comprises:
    in response to the type of the WiFi connection terminal being an IOS type, reducing the timeout retry time of the DHCP detection; and
    in response to the type of the WiFi connection being an Android type, increasing the timeout retry time of the DHCP detection.

3. The network matching and pairing method according to claim 1, wherein after the transmitting WiFi information to the device via bluetooth, the method further comprises:
    receiving device information sent from the device via bluetooth, and transmitting, based on the device information, a registration request corresponding to the device to a registration end.

4. The network matching and pairing method according to claim 1, wherein the device includes a smart speaker controlled by a smart terminal.

5. A non-transitory computer readable medium, storing a computer program thereon, wherein the program is executed, implements the network matching and pairing method according to claim 1.

6. A network matching and pairing method, comprising:
    connecting to a control terminal via bluetooth;
    receiving an instruction of setting a high bluetooth connection parameter from the control terminal via bluetooth, and setting a bluetooth connection parameter as a high bluetooth connection parameter;
    receiving an instruction of adjusting a timeout retry time of a DHCP detection, and adjusting a timeout retry time of a DHCP detection;
    receiving WiFi information from the control terminal via bluetooth, the WiFi information comprising information of a WiFi connection end;
    executing a WiFi pre-scanning process based on the WIFI information;
    receiving an instruction of setting a low bluetooth connection parameter from the control terminal via bluetooth, and setting the bluetooth connection parameter as a low bluetooth connection parameter; and
    connecting to the WiFi connection terminal via WiFi.

7. The network matching and pairing method according to claim 6, wherein
    the setting a bluetooth connection parameter as a high Bluetooth connection parameter comprises:
    setting a task priority of a bluetooth connection driver to be greater than a task priority of a WiFi connection driver; and
    the setting the bluetooth connection parameter as a low bluetooth connection parameter comprises:
    setting the task priority of the WiFi connection driver to be greater than the task priority of the bluetooth connection driver.

8. A device, comprising:
    at least one processor; and
    a memory storing instructions, the instructions when executed by the at least one processor, cause the at least one processor to perform the method according to claim 6.

9. The device according to claim 8, wherein
    the setting a bluetooth connection parameter as a high Bluetooth connection parameter comprises: setting a task priority of a bluetooth connection driver to be greater than a task priority of a WiFi connection driver; and
    the setting the bluetooth connection parameter as a low bluetooth connection parameter comprises:
    setting the task priority of the WiFi connection driver to be greater than the task priority of the bluetooth connection driver.

10. A non-transitory computer readable medium, storing a computer program thereon, wherein the program is executed, implements the network matching and pairing method according to claim 6.

11. A control terminal, comprising:
    at least one processor; and
    a memory storing instructions, the instructions when executed by the at least one processor, cause the at least one processor to perform operations, the operations comprising:
    connecting to a device via bluetooth;
    transmitting an instruction of setting a high bluetooth connection parameter to the device via bluetooth, for the device to set a Bluetooth connection parameter thereof as a high Bluetooth connection parameter;

transmitting WiFi information to the device via bluetooth, the WiFi information comprising information of a WiFi connection end; and transmitting an instruction of setting a low bluetooth connection parameter to the device via bluetooth, for the device to set the bluetooth connection parameter thereof as a low bluetooth connection parameter and to connect to the WiFi connection terminal via WiFi under the low bluetooth connection parameter, wherein before the transmitting WiFi information to the device via bluetooth, the operations further comprise:

receiving the WiFi information, and determining a WiFi type of the WiFi connection end based on the WIFI information; and in response to the determined WiFi type being a hotspot, transmitting an instruction of adjusting a timeout retry time of a DHCP detection to the device according to the type of the WiFi connection end, for the device to adjust a timeout retry time of a DHCP detection corresponding to the WiFi connection end.

12. The control terminal according to claim 11, wherein the adjusting a timeout retry time of a DHCP detection comprises:

reducing the timeout retry time of the DHCP detection in response to the type of the WiFi connection terminal being an IOS type; and increasing the timeout retry time of the DHCP detection in response to the type of the WiFi connection being an Android type.

13. The control terminal according to claim 11, wherein after the transmitting WiFi information to the device via bluetooth, the operations further comprise:

receiving device information sent from the device via bluetooth; and, transmitting, based on the device information, a registration request corresponding to the device to a registration end.

14. The control terminal according to claim 11, wherein the device includes a smart speaker controlled by a smart terminal.

* * * * *